United States Patent
Takigawa et al.

(10) Patent No.: US 9,813,846 B2
(45) Date of Patent: Nov. 7, 2017

(54) SHORT-DISTANCE RADIO COMMUNICATION SYSTEM FOR VEHICLE

(71) Applicant: Panasonic Intellectual Property Management Co., Ltd., Osaka (JP)

(72) Inventors: Masami Takigawa, Kanagawa (JP); Naoki Hayashi, Kanagawa (JP); Jun Fujiyama, Kanagawa (JP); Toru Nishimura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/074,012

(22) Filed: Mar. 18, 2016

(65) Prior Publication Data

US 2016/0205498 A1    Jul. 14, 2016

Related U.S. Application Data

(63) Continuation of application No. PCT/JP2014/004968, filed on Sep. 29, 2014.

(30) Foreign Application Priority Data

Oct. 2, 2013 (JP) ................. 2013-207251

(51) Int. Cl.
- *H04W 4/00* (2009.01)
- *B60R 25/24* (2013.01)
- *H01Q 1/32* (2006.01)

(52) U.S. Cl.
CPC ........... *H04W 4/008* (2013.01); *B60R 25/245* (2013.01); *H01Q 1/32* (2013.01)

(58) Field of Classification Search
CPC ........ H04B 5/00; H01Q 1/3241; H01Q 1/325; H04W 4/008; B60R 25/245
See application file for complete search history.

(56) References Cited

U.S. PATENT DOCUMENTS

| | | | |
|---|---|---|---|
| 2004/0174245 A1 | 9/2004 | Brillon | |
| 2004/0183714 A1* | 9/2004 | Yamashita | G07C 9/00309 342/70 |

(Continued)

FOREIGN PATENT DOCUMENTS

| JP | 2004-129228 | 4/2004 |
|---|---|---|
| JP | 2004-263447 | 9/2004 |

(Continued)

OTHER PUBLICATIONS

International Search Report of PCT application No. PCT/JP2014/004968 dated Jan. 6, 2015.

*Primary Examiner* — Ping Hsieh

(74) *Attorney, Agent, or Firm* — Pearne & Gordon LLP

(57) ABSTRACT

This short-distance radio communication system for a vehicle includes an in-vehicle unit having more than one antenna and a portable unit performing radio communications with the in-vehicle unit. The in-vehicle unit transmits a first burst together with a call signal for calling the portable unit through a first antenna, and transmits a second burst subsequent to the first burst through a second antenna. The portable unit receives the signals transmitted from the in-vehicle unit, measures respective received signal strength indicators from the first burst and the second burst contained in the received signals, and responds to the in-vehicle unit according to results of comparing the respective indicators with given thresholds.

4 Claims, 11 Drawing Sheets

(56) References Cited

U.S. PATENT DOCUMENTS

| | | | | |
|---|---|---|---|---|
| 2011/0148573 A1* | 6/2011 | Ghabra | ................ | B60R 25/245 340/5.61 |
| 2012/0154114 A1* | 6/2012 | Kawamura | ........... | B60R 25/245 340/5.63 |
| 2014/0368313 A1* | 12/2014 | Seiberts | ............. | G07C 9/00309 340/5.61 |

FOREIGN PATENT DOCUMENTS

| | | |
|---|---|---|
| JP | 2006-283436 | 10/2006 |
| JP | 2007-070953 | 3/2007 |
| JP | 2010-060457 A | 3/2010 |
| JP | 2010-216142 | 9/2010 |
| JP | 2011-144624 | 7/2011 |

\* cited by examiner

SHORT-DISTANCE RADIO COMMUNICATION SYSTEM FOR VEHICLE

TECHNICAL FIELD

The present disclosure relates to a short-distance radio communication system for a vehicle that performs short-distance radio communications between a key carried by a user and a vehicle.

BACKGROUND ART

In recent years, a smart entry system evolved from a keyless entry system is achieving widespread use as a system for locking and unlocking doors of a vehicle. A keyless entry system locks and unlocks vehicle doors with a button provided on the key pressed, where the key needs to be taken out from a bag or pocket for example.

On the other hand, a smart entry system, provided with a short-distance radio communication capability between a vehicle and a key (referred to as a smart key hereinafter), locks and unlocks vehicle doors by means of radio communications between the vehicle and vehicle doors. Concretely, a user unlocks vehicle doors simply by touching a touch sensor on the vehicle with a smart key remaining in a bag or pocket while the vehicle doors are locked; the user locks vehicle doors simply by touching the touch sensor while the vehicle doors are unlocked. With a smart entry system, if a smart key is detected inside the vehicle, the engine can be started without the need of inserting the key into the key hole of the vehicle. Under such circumstances, whether a smart key is present inside or outside a vehicle needs to be properly detected.

This smart entry system is provided with more than one antennas on the vehicle and an antenna control unit that controls to determine which antenna is to be used. When the antenna control unit transmits a high-power signal to an intended antenna, a weak signal can be accordingly sent to other antennas that must be under no-signal conditions, a problem called crosstalk.

For example, to detect a smart key, when an antenna provided inside a vehicle transmits a high-power signal toward the smart key, an antenna provided outside the vehicle as well transmits a signal that is low-power but can be detected by the smart key. At this moment, if the smart key is present immediately near the outside antenna, determination and positioning is made that the smart key is present inside the vehicle. For example, in a case where a user is outside the vehicle with their back facing a door handle, with a smart key remaining in a rear pocket for instance, determination is made that the smart key is inside the vehicle. In such a state, a small child may accidentally start the engine.

To avoid such a situation, the technology disclosed in patent literature 1 for example has been devised. Patent literature 1 discloses a technology in which, while coding signals are not transmitted to the first antenna, a disturbing signal is transmitted to the second antenna to turn the second antenna into no-signal conditions.

CITATION LIST

Patent Literature

PTL 1 Japanese Patent Unexamined Publication No. 2004-129228

SUMMARY OF THE INVENTION

In the technology disclosed in above patent literature 1, the left front door is provided with a first antenna, and the right front door is provided with a second antenna, where these antennas are placed apart from each other, and thus each coverage of signals from each antenna does not overlap with the other coverage. In a typical smart entry system, an antenna is provided inside the vehicle and the antenna (e.g., the first antenna) inside the vehicle and the antenna (e.g., a second antenna) on the front door are close to each other, and thus the coverages of signals from the antennas may overlap with each other. In such circumstances, the antenna on the front door in no-signal conditions induces the in-vehicle antenna to no-signal conditions in a region where signal coverages overlap, which disables detecting a smart key present in this region.

An object of the present disclosure is to provide a short-distance radio communication system for a vehicle that properly detects the position of a smart key even in a case where crosstalk occurs between antennas.

A short-distance radio communication system for a vehicle of the present disclosure includes an in-vehicle unit having more than one antenna and a portable unit performing radio communications with the in-vehicle unit. The system may have the following configuration. That is, the in-vehicle unit transmits a first burst together with a call signal for calling the portable unit through the first antenna, and then transmits a second burst subsequent to the first burst through the second antenna. The portable unit receives the signals transmitted from the in-vehicle unit; measures respective received signal strength indicators from the first and second bursts contained in the received signals; and responds to the in-vehicle unit according to results of comparing the respective indicators with given thresholds.

A short-distance radio communication system for a vehicle of the present disclosure includes more than one antenna provided in an enclosed space formed of an enclosed body; a first communication device provided in the enclosed space; and a second communication device that is portable and performs radio communications with the first communication device. The system may have the following configuration. That is, the first communication device transmits a first burst together with a call signal for calling the second communication device through the first antenna, and then transmits a second burst subsequent to the first burst through the second antenna. The second communication device receives the signals transmitted from the first communication device; measures respective received signal strength indicators from the first and second bursts contained in the received signals; and responds to the first communication device according to results of comparing the respective indicators with given thresholds.

According to the present disclosure, the position of a smart key can be accurately detected even in a case where crosstalk occurs between antennas.

DESCRIPTION OF EMBODIMENTS

Hereinafter, a detailed description is made of some embodiments of the present disclosure in reference to the drawings.

First Exemplary Embodiment

Figure 1:
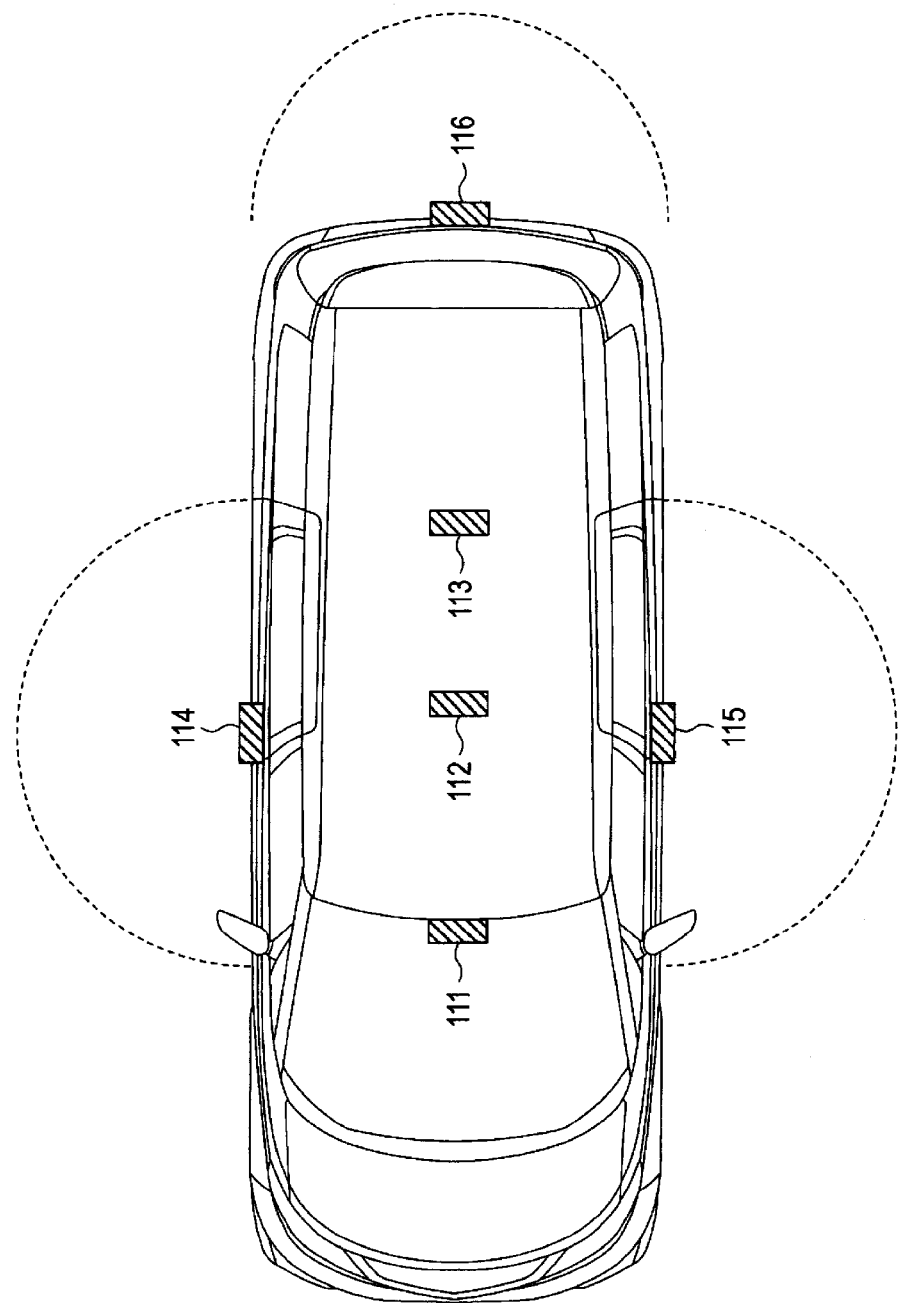
FIG. 1 illustrates the positions of antennas for smart entry provided on a vehicle.

FIG. 1 illustrates the positions of antennas for smart entry provided on a vehicle (enclosed body). In FIG. 1, the vehicle has three antennas: in-vehicle front antenna (F antenna hereinafter) 111, in-vehicle middle antenna (M antenna hereinafter) 112, and in-vehicle rear antenna (R antenna hereinafter) 113 inside the vehicle (an enclosed space).

Outside the vehicle, three antennas are provided: out-vehicle driver's seat door handle antenna (FRDR antenna hereinafter) 114, out-vehicle passenger's seat door handle antenna (FRAS antenna hereinafter) 115, and out-vehicle tail gate antenna (TG antenna hereinafter) 116.

In the first embodiment, a description is made of a case where the system prevents the engine from starting when a smart key is present near FRDR antenna or FRAS antenna (i.e., outside the vehicle). In the following description, the smart key is assumed to be present near FRAS antenna.

Figure 2:
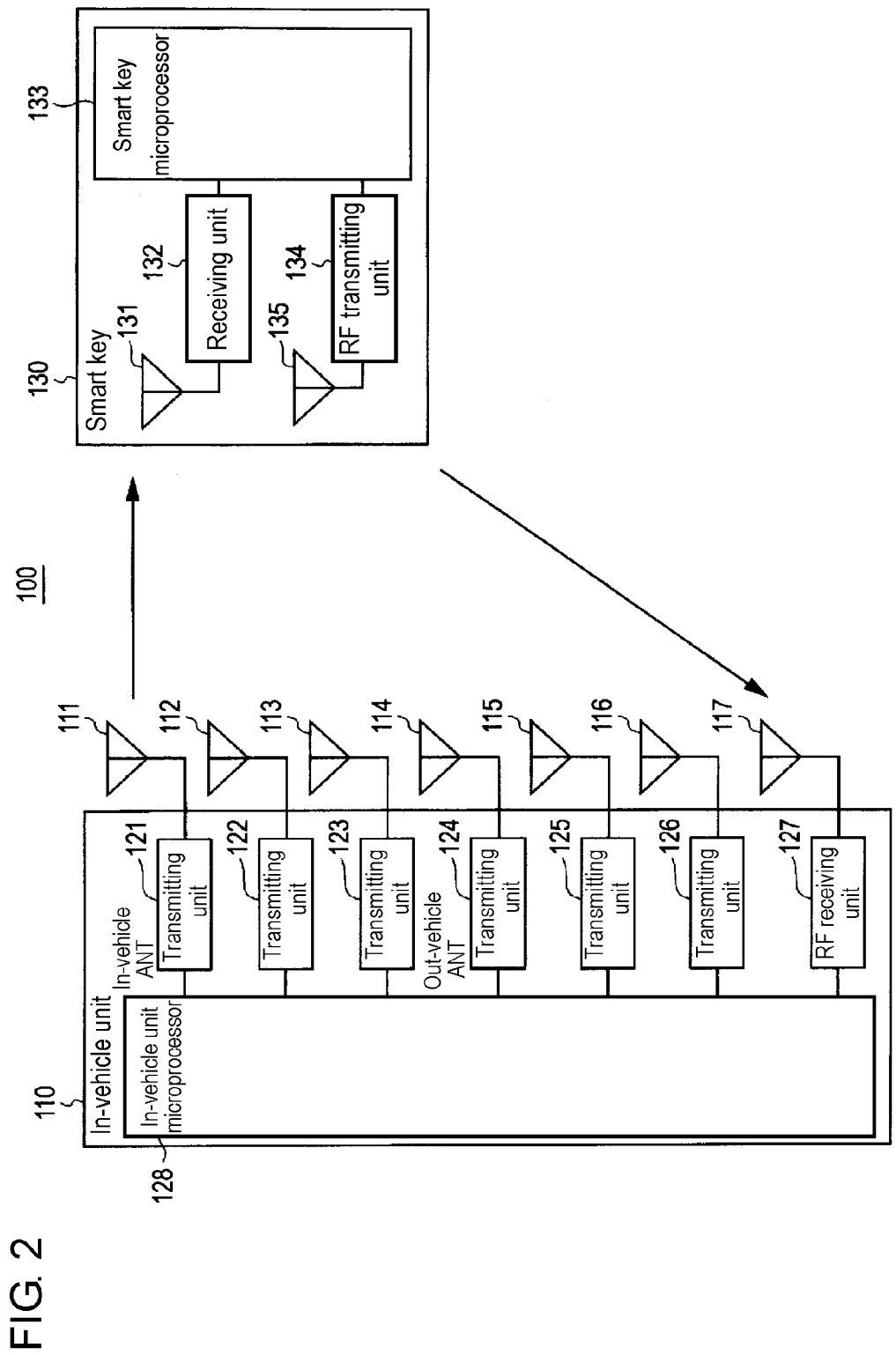
FIG. 2 illustrates an outline structure of a smart entry system according to the first exemplary embodiment of the present disclosure.

FIG. 2 illustrates an outline structure of smart entry system 100, which is a short-distance radio communication system for a vehicle according to the first exemplary embodiment. Smart entry system 100 includes in-vehicle unit 110 (the first communication device) provided on the vehicle, and smart key 130 (the second communication device) carried by a user.

In-vehicle unit 110 includes multiple transmitting antennas 111 through 116, transmitting units 121 through 126, RF receiving antenna 117, RF receiving unit 127, and in-vehicle unit microprocessor (also referred to as an antenna control unit) 128.

Multiple transmitting antennas 111 through 116 correspond to F antenna 111, M antenna 112, R antenna 113, FRDR antenna 114, FRAS antenna 115, and TG antenna 116, where the first three are provided inside the vehicle; the last three, outside.

Transmitting units 121 to 126 are respectively connected to transmitting antennas 111 to 116, perform transmission processes (e.g., modulation, amplification) on a signal output from in-vehicle unit microprocessor 128, and transmit the resulting signal through one of the transmitting antennas.

RF receiving antenna 117 receives an RF (radio frequency) signal transmitted from smart key 130. RF receiving unit 127 performs reception processes (e.g., demodulation) on the signal received by RF receiving antenna 117, and outputs the signal that has undergone reception processes to in-vehicle unit microprocessor 128.

In-vehicle unit microprocessor 128 controls to determine which one of transmitting antennas 111 to 116 is to be used, and controls operation such as locking/unlocking of vehicle doors and permits engine start according to results of detecting smart key 130.

Meanwhile, smart key 130 includes receiving antenna 131, receiving unit 132, microprocessor on the smart key (smart key microprocessor) 133, RF transmitting unit 134, and RF transmitting antenna 135.

Receiving antenna 131 receives a signal transmitted from each of antennas 111 through 116 of in-vehicle unit 110. Receiving unit 132 performs reception processes (e.g., demodulation) on the signal received through receiving antenna 131, and outputs the signal that has undergone reception processes to smart key microprocessor 133.

Smart key microprocessor 133 measures an RSSI (received signal strength indicator) from a signal output from receiving unit 132; compares the RSSI measured with a given threshold (threshold decision); and outputs an RF response to RF transmitting unit 134 according to the decision results. Detailed operation of smart key microprocessor 133 is described later.

RF transmitting unit 134 performs transmission processes (e.g., modulation, amplification) on the RF response output from smart key microprocessor 133, and transmits the RF response that has undergone transmission processes to in-vehicle unit 110 through RF transmitting antenna 135.

Figure 3:
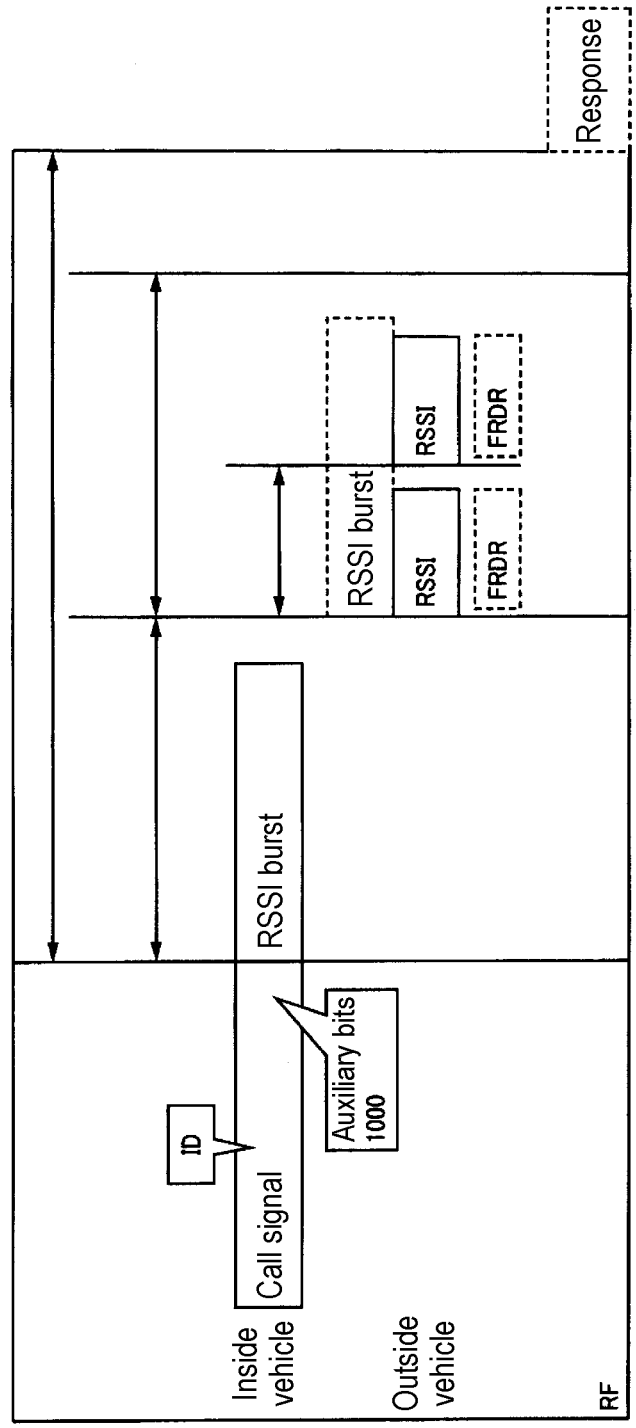
FIG. 3 illustrates signals and their timing transmitted from each antenna by the microprocessor on the in-vehicle unit shown in FIG. 2.

FIG. 3 illustrates signals and their timing that in-vehicle unit microprocessor 128 shown in FIG. 2 transmits through each of antennas 111 through 116. In-vehicle unit microprocessor 128 successively transmits call signals and RSSI bursts (first burst) through F antenna 111, M antenna 112, and R antenna 113, and at their each timing transmits RSSI bursts (second burst) for FRDR and FRAS. FIG. 3 illustrates circumstances when signals are transmitted through F antenna 111 as an example. Here, a burst refers to a radio signal transmitted for measuring a received signal strength indicator.

In FIG. 3, a call signal contains a signal for waking up smart key 130 in a sleep state, an ID for authenticating pairing of in-vehicle unit 110 and smart key 130, and auxiliary bits. Here, a sleep state refers to a state where a smart key wakes up when receiving a call signal. Details about auxiliary bits are described later. An RSSI burst for F antenna is a continuous signal for smart key 130 to measure an RSSI (received signal strength indicator) through F antenna 111. The signals of from a call signal to an RSSI burst for F antenna are in the existing format.

Similarly, RSSI bursts for FRDR and for FRAS are continuous signals for measuring RSSIs from each antenna.

FIG. 3 shows a case where a signal is transmitted through F antenna 111; the situation is the same for M antenna 112 and R antenna 113.

Smart key 130 that has received such signals measures an RSSI from each RSSI burst; compares the RSSI measured with a given threshold; and detects the position of smart key 130 based on the results of the threshold decision. In this case, smart key 130 is assumed to be present near FRAS antenna 115, and thus does not respond to the call through F antenna 111.

Next, a description is made of auxiliary bits. The auxiliary bits are set to "0000" in the existing format, which directs decision of an RSSI burst for each antenna subsequent to the auxiliary bits. In this embodiment, when auxiliary bits are "1000", the existing format is followed by an RSSI burst for FRDR and an RSSI burst for FRAS that are allocated direction of measuring RSSIs. That is, the auxiliary bits contained in the call signal shown in FIG. 3 are set to "1000".

Figure 4:
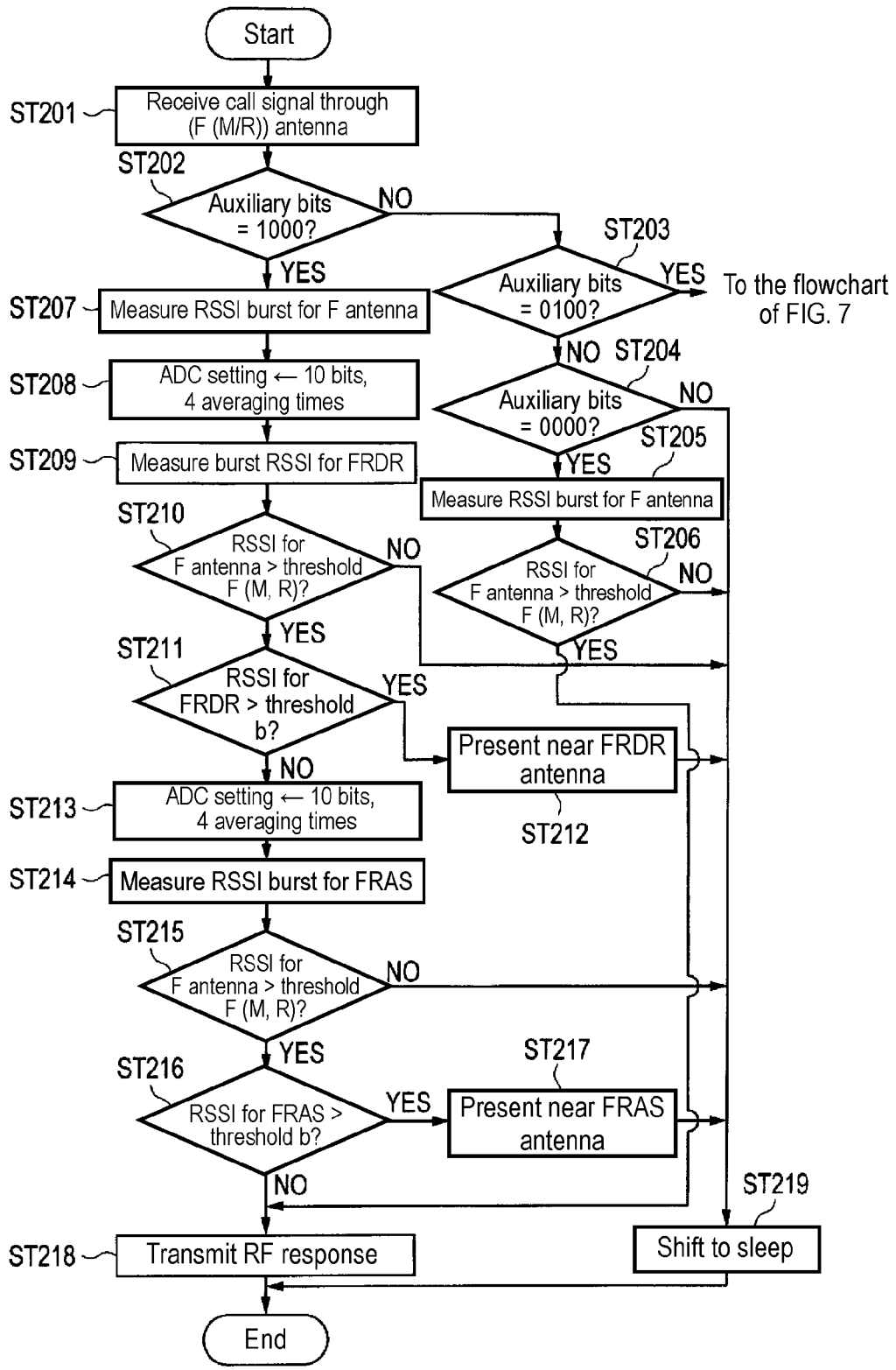
FIG. 4 is a flowchart showing the operation procedure of the microprocessor on the smart key shown in FIG. 2.
Figure 5:
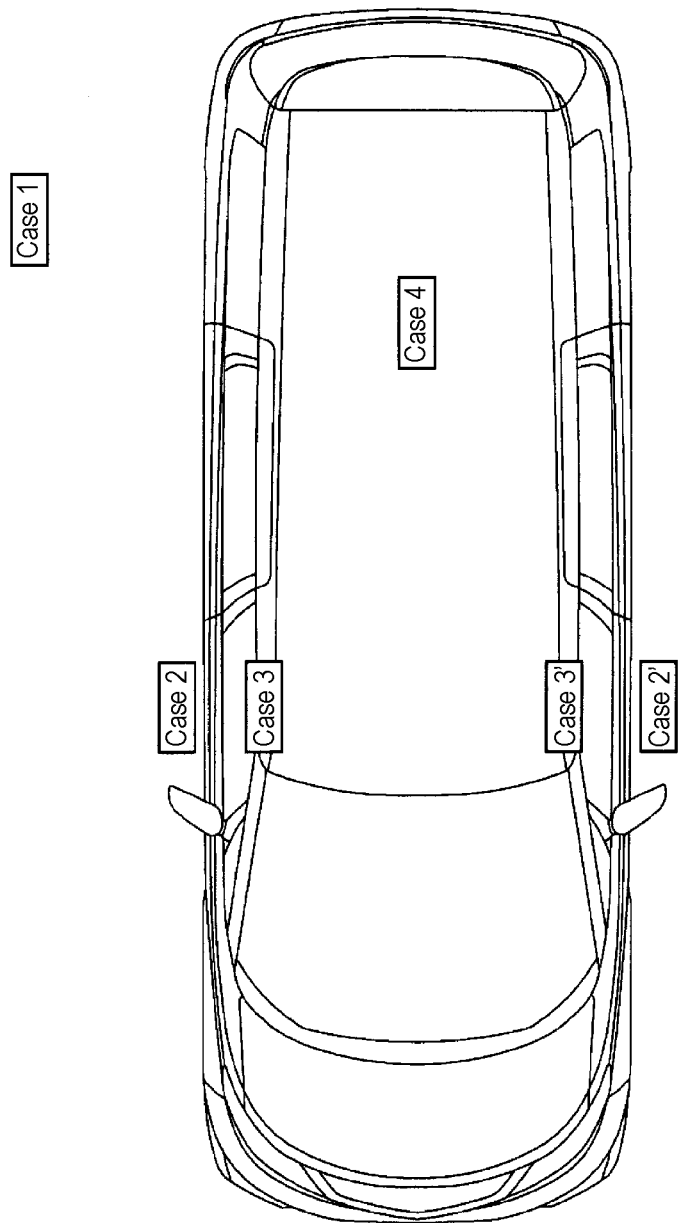
FIG. 5 illustrates possible areas where the smart key is present with respect to the vehicle viewed from the above.

Next, a description is made of detailed operation of smart key microprocessor 133 shown in FIG. 2 using FIGS. 4 and 5. FIG. 4 is a flowchart showing the operation procedure of smart key microprocessor 133. FIG. 5 illustrates possible areas where the smart key is present with respect to the vehicle viewed from the above.

In step ST201 of FIG. 4, smart key microprocessor 133 receives a call signal through F antenna. In step ST202, determination is made whether or not the auxiliary bits contained in the call signal are "1000". If not "1000" (ST202: NO), the process proceeds to step ST203; otherwise (YES: step ST202), to step ST207.

In step ST203, smart key microprocessor 133 determines whether or not the auxiliary bits contained in the call signal are "0100". If not "0100" (step ST203: NO), the process proceeds to step ST204; otherwise (step ST203: YES), to the flowchart of FIG. 7.

In step ST204, smart key microprocessor 133 determines whether or not the auxiliary bits contained in the call signal are "0000". If not "0000" (step ST204: NO), the process proceeds to ST219, and smart key 130 shifts to a sleep state. Meanwhile, if the auxiliary bits are "0000" (step ST204: YES), the process proceeds to step ST205.

In step ST205, smart key microprocessor 133 measures an RSSI burst (first burst) for each in-vehicle antenna (here, F antenna for example). In step ST206, smart key microprocessor 133 determines whether or not the RSSI from in-vehicle F antenna exceeds given threshold F (a threshold indicating the effective coverage of F antenna). If exceeding (step ST206: YES), the process proceeds to step ST218; otherwise (step ST206: NO), to ST219, and smart key 130 shifts to a sleep state.

In step ST202, if the auxiliary bits are "1000" (step ST202: YES), smart key microprocessor 133 measures an RSSI burst for each in-vehicle antenna (here, F antennae for example) in step ST207. At this moment, the AD converter (hereinafter, referred to as an ADC) is set to a 10-bit resolution and 64 averaging times.

In step ST208, smart key microprocessor 133 sets the ADC to a 10-bit resolution and 4 averaging times. In step ST209, smart key microprocessor 133 measures an RSSI burst (second burst) for FRDR.

In step ST210, smart key microprocessor 133 determines whether or not the RSSI from in-vehicle F antenna exceeds given threshold F. If exceeding (step ST210: YES), the process proceeds to step ST211; otherwise (step ST210: NO), smart key 130 being assumed to be present away from the vehicle (case 1 shown in FIG. 5), the process proceeds to step ST219, and smart key 130 shifts to a sleep state.

In step ST211, smart key microprocessor 133 determines whether or not the RSSI from out-vehicle FRDR antenna exceeds given threshold b. If exceeding (step ST211: YES), the process proceeds to step ST212; otherwise, to step ST213.

In step ST212, smart key microprocessor 133 determines that smart key 130 is present near FRDR antenna (case 2 shown in FIG. 5). The process proceeds to step ST219, and smart key 130 shifts to a sleep state.

In step ST213, smart key microprocessor 133 sets the ADC to a 10-bit resolution and 4 averaging times. In step ST214, smart key microprocessor 133 measures an RSSI burst (third burst) for FRAS.

In step ST215, smart key microprocessor 133 determines whether or not the RSSI from in-vehicle F antenna exceeds given threshold F. If exceeding (step ST215: YES), the process proceeds to step ST216; otherwise (step ST215: NO), smart key 130 being assumed to be present away from the vehicle (case 1 in FIG. 5), the process proceeds to step ST219, and smart key 130 shifts to a sleep state.

In step ST216, smart key microprocessor 133 determines whether or not the RSSI from out-vehicle FRAS antenna exceeds given threshold b (the same value as the crosstalk threshold). If exceeding (step ST216: YES), the process proceeds to step ST217; otherwise (step ST216: NO), to step ST218.

In step ST217, smart key microprocessor 133 determines that smart key 130 is present near FRAS antenna (case 2' shown in FIG. 5), the process proceeds to step ST219, and smart key 130 shifts to a sleep state.

In step ST218, smart key 130 is assumed to be present inside the vehicle (case 4 shown in FIG. 5) and smart key microprocessor 133 transmits an RF response to the vehicle.

In this way, smart key microprocessor 133 compares an RSSI measured from an RSSI burst for each in-vehicle antenna with given threshold F. If this RSSI exceeds threshold F, smart key 130 is present inside the vehicle with a high possibility. Smart key 130, however, can be present outside the vehicle under the influence of crosstalk. Thus, smart key microprocessor 133 compares RSSIs measured from RSSI bursts for FRDR and for FRAS with given threshold b. If determination has been made that an RSSI is larger than threshold b, smart key 130 proves present near the relevant antenna outside the vehicle. Hence, the position of a smart key can be detected without the need of an additional hardware device.

Thus according to the first embodiment, every time the system transmits a call signal and an RSSI burst successively through each in-vehicle antenna, the system transmits RSSI bursts for FRDR and for FRAS, measures an RSSI from each RSSI burst received by the smart key, and compares the RSSI measured with a given threshold. This allows the position of the smart key to be accurately detected based on results of the threshold decision. This prevents the engine from starting when the smart key is present near FRDR antenna or FRAS antenna (i.e., outside the vehicle). Here, the first and second bursts may be those transmitted from three antennas freely chosen from six antennas: F antenna 111, M antenna 112, R antenna 113, FRDR antenna 114, FRAS antenna 115, and TG antenna 116.

Second Exemplary Embodiment

In the second exemplary embodiment, a description is made of a case where, when a smart key as a portable unit is present near one door antenna (FRDR or FRAS antenna), the system prevents entry from another door. In the following description, a smart key is assumed to be present near FRAS antenna. The smart entry system, which is a short-distance radio communication system for a vehicle of the second embodiment, has a configuration similar to that of the first embodiment shown in FIG. 2, and thus a description is made referring to FIG. 2 as required.

Figure 6:
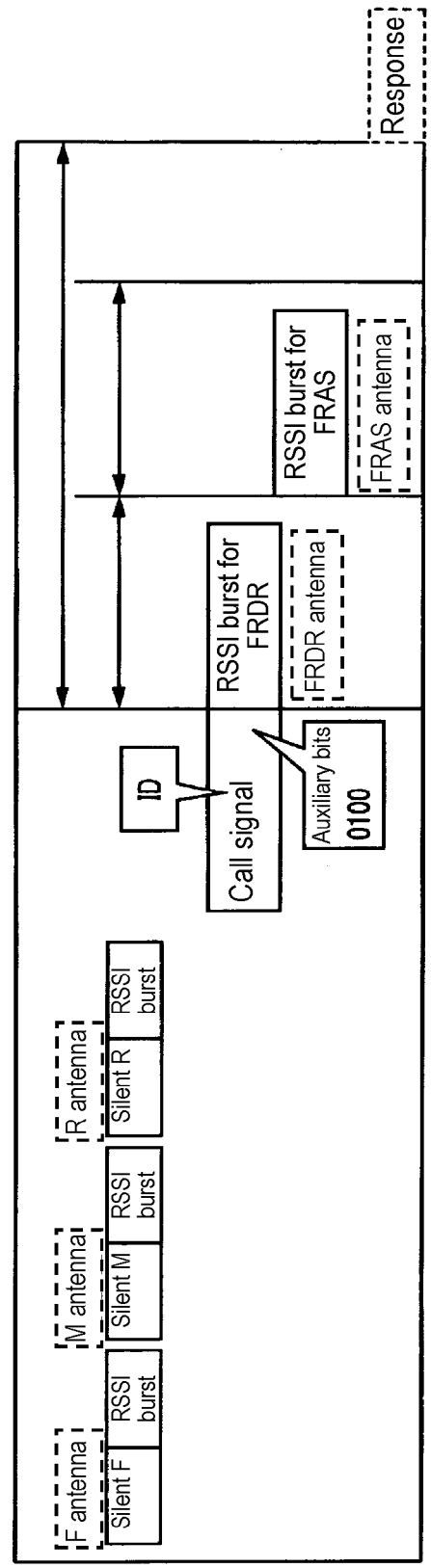
FIG. 6 illustrates signals and their timing transmitted from each antenna by the microprocessor on the in-vehicle unit according to the second exemplary embodiment of the present disclosure.

FIG. 6 illustrates signals and their timing that in-vehicle unit microprocessor 128 according to the second embodiment transmits through each antenna. In-vehicle unit 110 successively transmits a silent direction signal and an RSSI burst from each antenna: F antenna 111, M antenna 112, and R antenna 113, then transmits a call signal and an RSSI burst for FRDR through FRDR antenna 114, and further transmits an RSSI burst for FRAS through FRAS antenna 115. The signals of from the silent direction signal of F antenna 111 to the RSSI burst for FRDR are in the existing format.

Smart key 130 that has received such signals, when receiving a silent direction signal from each in-vehicle antenna, maintains a silent state. A silent state refers to a state where a call signal received is ignored. Then, smart key 130, when receiving a call signal through FRDR antenna 114, measures respective RSSIs from RSSI bursts for FRDR and for FRAS, and compares the RSSIs measured with given thresholds to detect the position of smart key 130. Here, smart key 130 is assumed to be present near FRAS antenna 115, and thus smart key 130 does not respond to the call form FRDR antenna 114.

Next, a description is made of auxiliary bits contained in the call signal shown in FIG. 6. In this embodiment, when the auxiliary bits are "0100", the existing format is followed by an RSSI burst for FRAS that are allocated direction of measuring an RSSI. That is, the auxiliary bits contained in the call signal shown in FIG. 6 are set to "0100".

Figure 7:
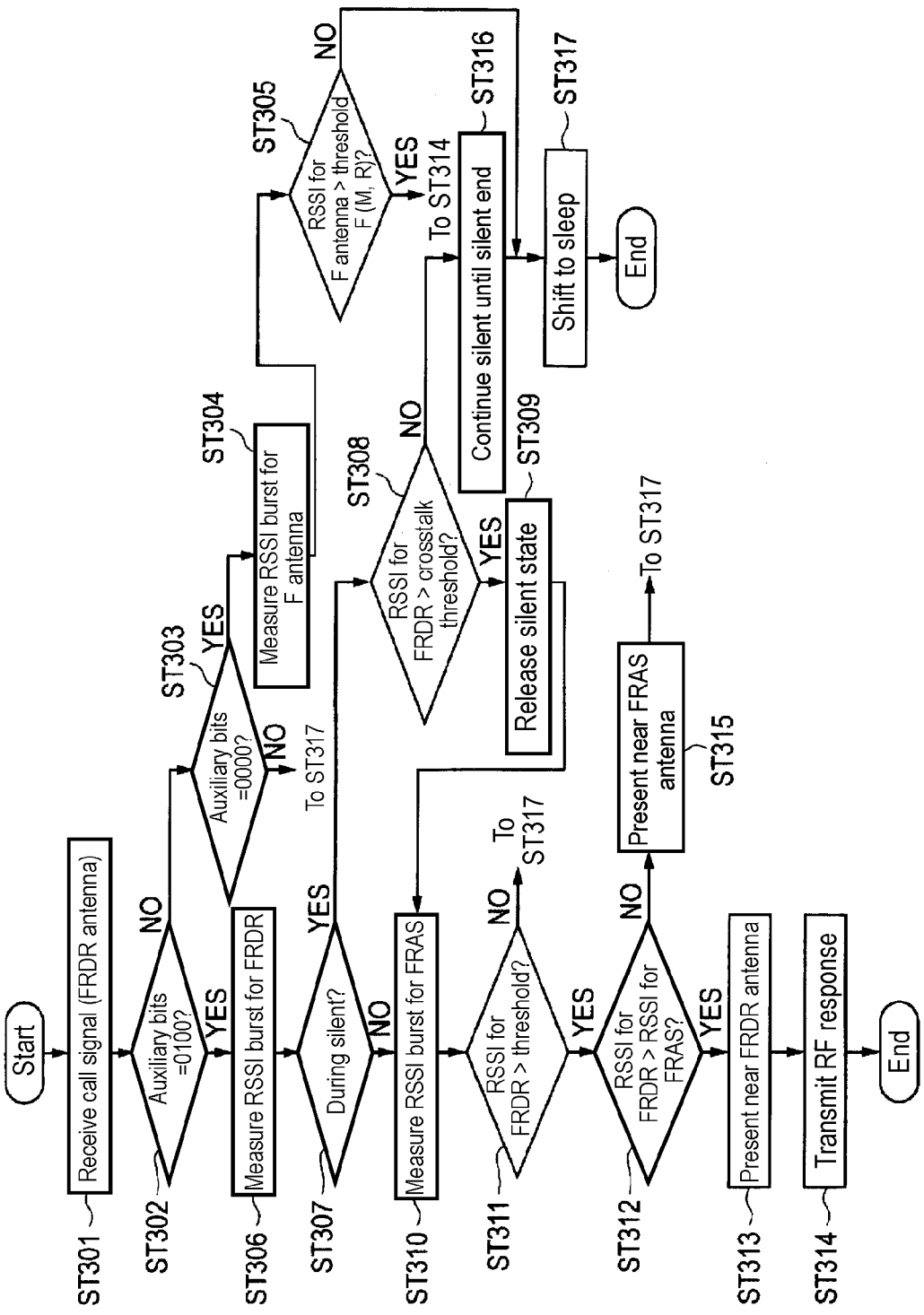
FIG. 7 is a flowchart showing the operation procedure of the microprocessor on the smart key according to the second embodiment.
Figure 8:
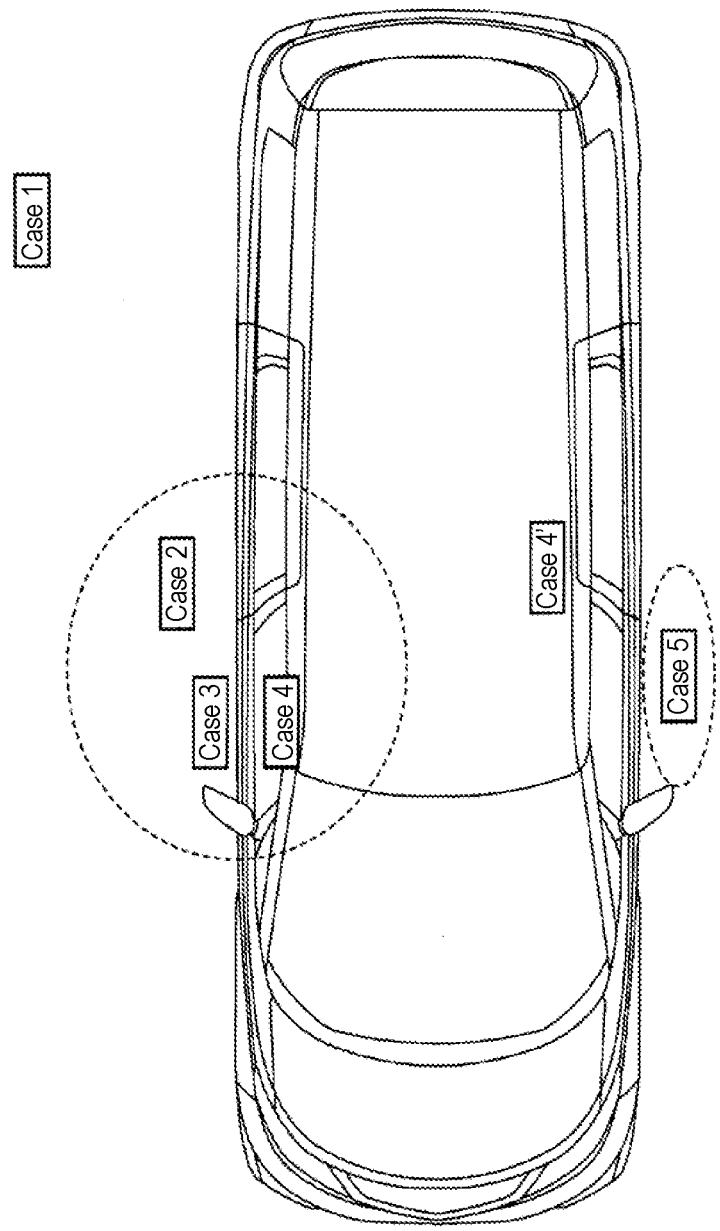
FIG. 8 illustrates possible areas where the smart key is present with respect to the vehicle viewed from the above.

Next, a description is made of detailed operation of smart key microprocessor 133 according to the second embodiment using FIGS. 7 and 8. FIG. 7 is a flowchart showing the operation procedure of smart key microprocessor 133. FIG. 8 illustrates possible areas where the smart key is present with respect to the vehicle viewed from the above.

In step ST301 of FIG. 7, smart key microprocessor 133 receives a call signal through FRDR antenna 114. In step ST302, smart key microprocessor 133 determines whether or not the auxiliary bits contained in the call signal are "0100". If not "0100" (step ST302: NO), the process proceeds to step ST303; otherwise (step ST302: YES), to step ST306.

In step ST303, smart key microprocessor 133 determines whether or not the auxiliary bits contained in the call signal are "0000". If not "0000" (step ST303: NO), the process proceeds to ST317, and smart key 130 shifts to a sleep state. Meanwhile, if the auxiliary bits are "0000" (step ST303: YES), the process proceeds to step ST304.

In step ST304, smart key microprocessor 133 measures an RSSI burst for each in-vehicle antenna (here, F antennae for example). In step ST305, smart key microprocessor 133 determines whether or not the RSSI from in-vehicle F antenna exceeds given threshold F (a threshold indicating the effective coverage of F antenna). If exceeding (step ST305: YES), the process proceeds to step ST314; otherwise (step ST305: NO), to ST317, and smart key 130 shifts to a sleep state.

If the auxiliary bits are "0100" (step ST302: YES) in step ST302, smart key microprocessor 133 measures an RSSI burst for FRDR in step ST306. At this moment, the ADC is set to a 10-bit resolution and 64 averaging times.

In step ST307, smart key microprocessor 133 determines whether or not the smart key is in silent. If in silent (step ST307: YES), the process proceeds to step ST308; otherwise (step ST307: NO), to step ST310.

In step ST308, smart key microprocessor 133 determines whether or not an RSSI for FRDR exceeds a given crosstalk threshold. If exceeding (step ST308: YES), smart key microprocessor 133 releases the silent state in ST309; otherwise (step ST308: NO), the process proceeds to step ST316. In step ST309, smart key 130 is assumed to be present near FRDR antenna 114 (case 3 shown in FIG. 8).

In step ST310, smart key microprocessor 133 measures an RSSI burst for FRAS. In step ST311, smart key microprocessor 133 determines whether or not an RSSI for FRDR exceeds a given threshold. If exceeding (step ST311: YES), the process proceeds to step ST312; otherwise (step ST311: NO), smart key 130 is assumed to be present away from the vehicle (case 1 shown in FIG. 8) and the process proceeds to step ST317.

In step ST312, smart key microprocessor 133 determines whether or not the RSSI for FRDR exceeds the RSSI for FRAS. If exceeding (step ST312: YES), the process proceeds to step ST313; otherwise (step ST312: NO), to ST315, where smart key 130 is assumed to be present near FRAS antenna 115 (case 5 shown in FIG. 8) and the process proceeds to step ST317.

In step ST313, smart key microprocessor 133 determines that smart key 130 is present near the FRDR antenna. In step ST314, smart key 130 is assumed to be present near FRDR antenna 114 (case 3 shown in FIG. 8), and smart key microprocessor 133 transmits an RF response to the vehicle.

In step ST315, smart key microprocessor 133 determines that smart key 130 is near FRAS antenna, the process proceeds to step ST317, and smart key 130 shifts to a sleep state.

In step ST316, smart key 130 is assumed to be present inside the vehicle (case 4 or case 4' shown in FIG. 8), and smart key microprocessor 133 continues silent until the end of silent. In step ST317, smart key 130 shifts to a sleep state.

In this way, smart key microprocessor 133 compares an RSSI measured from an RSSI burst for FRDR with a given threshold. If this RSSI exceeds the threshold, smart key 130 is present near FRDR antenna 114 with a high possibility. Smart key 130, however, can be present near FRAS antenna 115 under the influence of crosstalk. Thus, smart key microprocessor 133 compares RSSIs measured from RSSI bursts for FRDR and for FRAS with each other. This determination results prove that smart key 130 is present near the antenna the RSSI of which has been determined as larger.

Thus according to the second embodiment, a call signal and an RSSI burst for FRDR are transmitted through FRDR antenna; further an RSSI burst for FRAS is transmitted through FRAS antenna; and an RSSI is measured from each RSSI burst received by a smart key for comparison between RSSIs. This allows the position of the smart key to be accurately detected according to the comparison results, which, when a smart key is present near one door antenna, prevents entry from another door.

Third Exemplary Embodiment

In a short-distance radio communication system for a vehicle according to the third exemplary embodiment, a description is made of a case where, when a smart key as a portable unit is present near one door antenna (FRDR or FRAS antenna), the system prevents unlocking of the tail gate. In the following description, a smart key is assumed to be present near FRAS antenna. The smart entry system, which is a short-distance radio communication system for a vehicle of the third embodiment, has a configuration similar to that of the first embodiment shown in FIG. 2, and thus a description is made referring to FIG. 2 as required.

Figure 9:
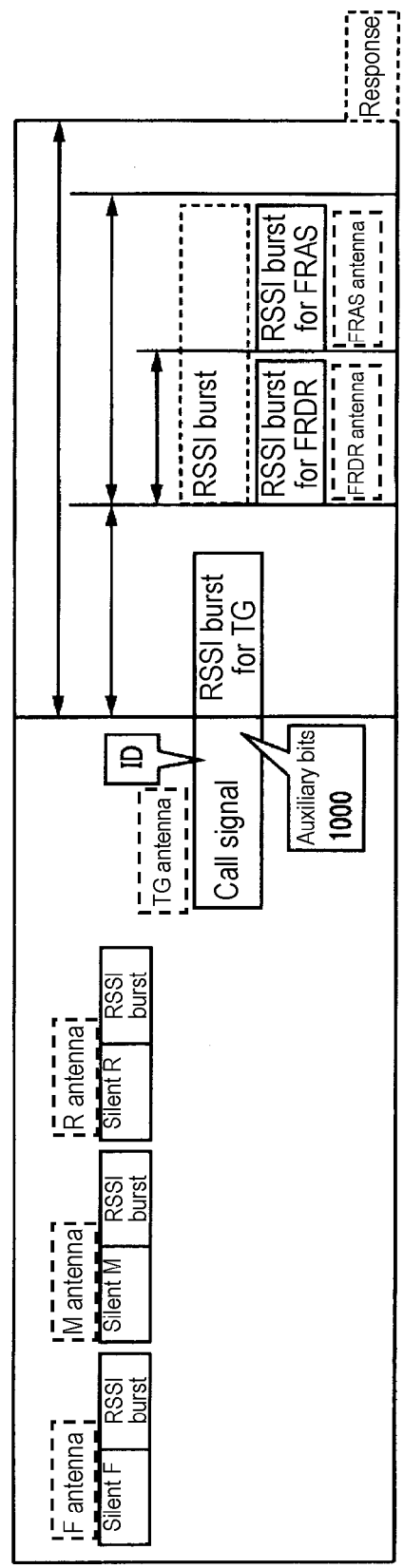
FIG. 9 illustrates signals and their timing transmitted from each antenna by the microprocessor on the in-vehicle unit according to the third exemplary embodiment of the present disclosure.

FIG. 9 illustrates signals and their timing that in-vehicle unit microprocessor 128 according to the third exemplary embodiment transmits through each antenna. In-vehicle unit 110 successively transmits a silent direction signal and an RSSI burst from each antenna: F antenna 111, M antenna 112, and R antenna 113, then transmits a call signal and an RSSI burst for TG through TG antenna 116, and further transmits an RSSI burst for FRDR through FRDR antenna 114 and an RSSI burst for FRAS through FRAS antenna 115. The signals of from the silent direction signal of F antenna 111 to the RSSI burst for TG are in the existing format.

Smart key 130 that has received such signals, when receiving a silent direction signal from each in-vehicle antenna, maintains a silent state. Then, smart key 130, when receiving a call signal through TG antenna 116, measures respective RSSIs from RSSI bursts for TG, FRDR, and FRAS, and compares the RSSIs measured with given thresholds to detect the position of smart key 130. Here, smart key 130 is assumed to be present near FRAS antenna 115, and thus smart key 130 does not respond to the call from TG antenna 116.

Note that the auxiliary bits contained in the call signal shown in FIG. 9 are the same as those of the first embodiment. When the auxiliary bits are "1000", the existing format is followed by RSSI bursts for FRDR and FRAS that are allocated direction of measuring RSSIs.

Figure 10:
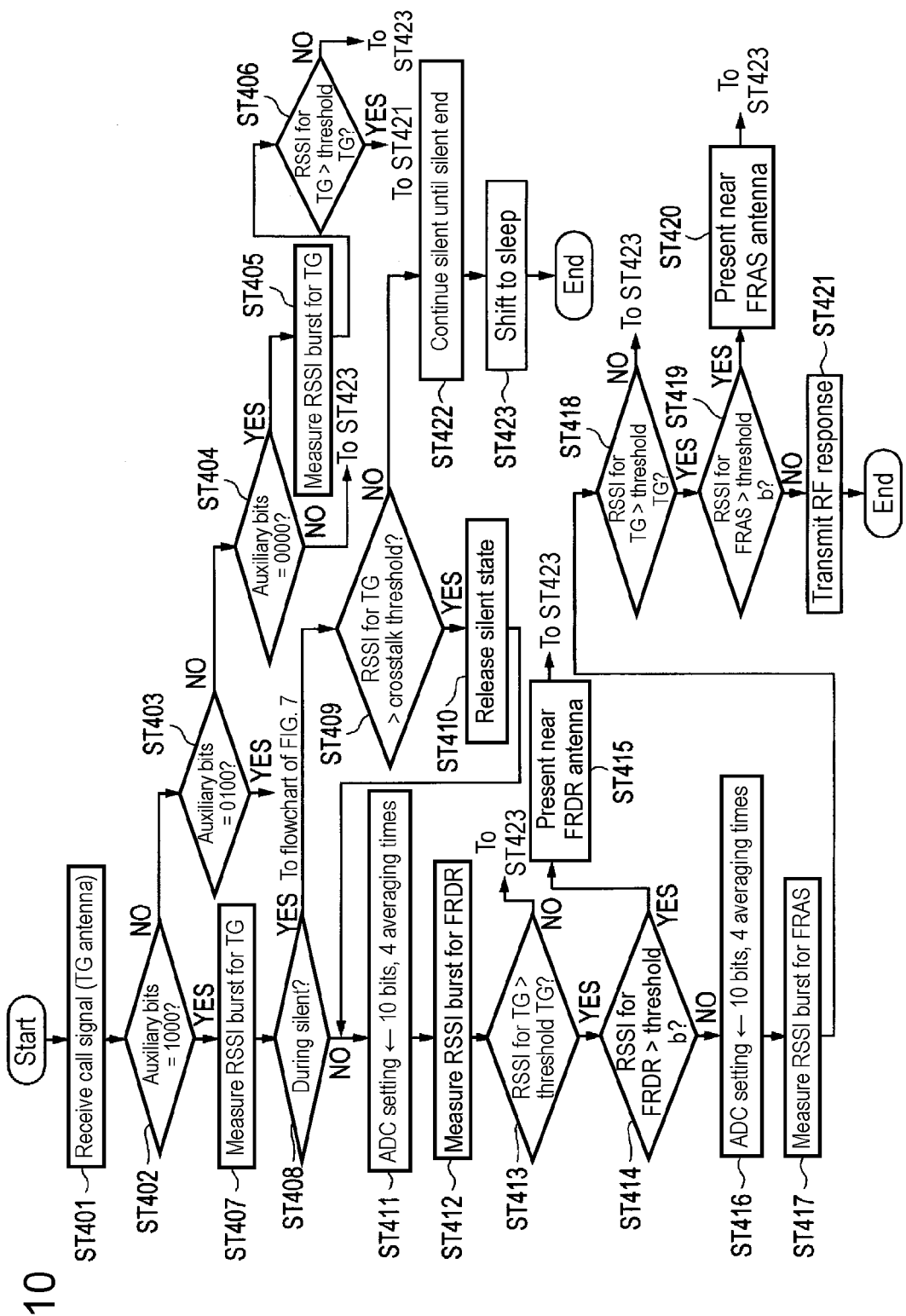
FIG. 10 is a flowchart showing the operation procedure of the microprocessor on the smart key according to the third embodiment.
Figure 11:
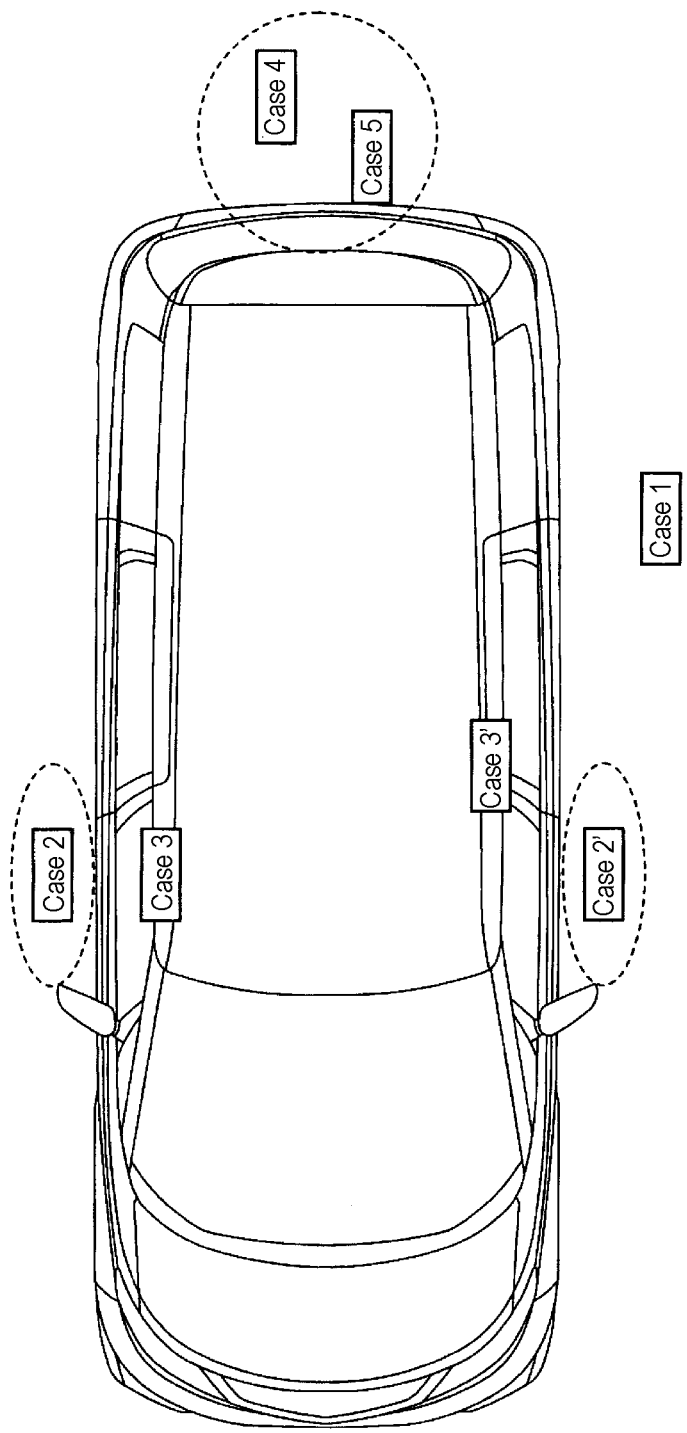
FIG. 11 illustrates possible areas where the smart key is present with respect to the vehicle viewed from the above.

Next, a description is made of detailed operation of smart key microprocessor 133 according to the third embodiment using FIGS. 10 and 11. FIG. 10 is a flowchart showing the operation procedure of smart key microprocessor 133. FIG. 11 illustrates possible areas where the smart key is present with respect to the vehicle viewed from the above.

In step ST401 in FIG. 10, smart key microprocessor 133 receives a call signal from the TG antenna. In step ST402, smart key microprocessor 133 determines whether or not the auxiliary bits contained in the call signal are "1000". If not "1000" (step ST402: NO), the process proceeds to step ST403.

In step ST403, smart key microprocessor 133 determines whether or not the auxiliary bits contained in the call signal are "0100". If not "0100" (step ST403: NO), the process proceeds to ST404; otherwise (step ST403: YES), to the flowchart of FIG. 7.

In step ST404, smart key microprocessor 133 determines whether or not the auxiliary bits contained in the call signal are "0000". If not "0000" (step ST404: NO), the process proceeds to ST423, and smart key 130 shifts to a sleep state. Meanwhile, if the auxiliary bits are "0000" (step ST404: YES), the process proceeds to step ST405.

In step ST405, smart key microprocessor 133 measures an RSSI burst for TG. In step ST406, smart key microprocessor 133 determines whether or not the RSSI from TG antenna exceeds given threshold TG (a threshold indicating the effective coverage of TG antenna). If exceeding (step ST406: YES), the process proceeds to step ST421; otherwise (step ST406: NO), to step ST423, and smart key 130 shifts to a sleep state.

In step ST402, if the auxiliary bits are "1000" (step ST402: YES), smart key microprocessor 133 measures an RSSI burst for TG in step ST407. At this moment, the ADC is set to a 10-bit resolution and 64 averaging times.

In step ST408, smart key microprocessor 133 determines whether or not the smart key is in silent. If in silent (step ST408: YES), the process proceeds to step ST409; otherwise (step ST408: NO), to step ST411.

In step ST409, smart key microprocessor 133 determines whether or not the RSSI for TG exceeds a given crosstalk threshold. If exceeding (step ST409: YES), smart key microprocessor 133 releases the silent state in ST410; otherwise (step ST409: NO), the process proceeds to step ST422. In ST410, smart key 130 is assumed to be present near the TG antenna (case 5 shown in FIG. 11), near the FRDR antenna (case 2), or near FRAS antenna (case 2').

In step ST411, smart key microprocessor 133 sets the ADC to a 10-bit resolution and 4 averaging times. In step ST412, smart key microprocessor 133 measures an RSSI burst for FRDR.

In step ST413, smart key microprocessor 133 determines whether or not the RSSI for TG exceeds given threshold TG. If exceeding (step ST413: YES), the process proceeds to step ST414; otherwise (step ST413: NO), to step ST423, where smart key 130 is assumed to be present away from the vehicle (case 1 shown in FIG. 11).

In step ST414, smart key microprocessor 133 determines whether or not the RSSI for FRDR exceeds given threshold b. If exceeding (step ST414: YES), the process proceeds to step ST415; otherwise (step ST414: NO), to step ST416.

In step ST415, smart key microprocessor 133 determines that smart key 130 is present near FRDR antenna (case 2), the process proceeds to step ST423, and smart key 130 shifts to a sleep state.

In step ST416, smart key microprocessor 133 sets the ADC to a 10-bit resolution and 4 averaging times. In step ST417, smart key microprocessor 133 measures an RSSI burst for FRAS.

In step ST418, smart key microprocessor 133 determines whether or not the RSSI for TG exceeds given threshold TG. If exceeding (step ST418: YES), the process proceeds to step ST419; otherwise (step ST418: NO), to step ST423, and smart key 130 shifts to a sleep state.

In step ST419, smart key microprocessor 133 determines whether or not the RSSI for FRAS exceeds given threshold b. If exceeding (step ST419: YES), the process proceeds to step ST420; otherwise (step ST419: NO), to step ST421.

In step ST420, smart key microprocessor 133 determines that smart key 130 is present near FRAS antenna 115 (case 2'), the process proceeds to step ST423, and smart key 130 shifts to a sleep state.

In step ST421, smart key 130 is assumed to be present near TG antenna (case 4 or case 5 shown in FIG. 11), and smart key microprocessor 133 transmits an RF response to the vehicle.

In step ST422, smart key 130 is assumed to be present inside the vehicle (case 3 or case 3' shown in FIG. 11), and smart key microprocessor 133 continues silent until the end of silent. In step ST423, smart key 130 shifts to a sleep state.

In this way, smart key microprocessor 133 compares an RSSI measured from an RSSI burst for TG with given threshold TG. If this RSSI exceeds threshold TG, smart key 130 is present near the tail gate with a high possibility. Smart key 130, however, can be present at another position under the influence of crosstalk. Thus, smart key microprocessor 133 compares RSSIs measured from RSSI bursts for FRDR and for FRAS with given threshold b. If determination has been made that an RSSI is larger than threshold b, smart key 130 is present near the relevant antenna outside the vehicle.

Thus according to the third embodiment, a call signal and an RSSI burst for TG are transmitted through TG antenna, RSSI bursts for FRDR and FRAS are further transmitted, and an RSSI is measured from each RSSI burst received by a smart key for comparison between RSSIs and given thresholds. This allows the position of the smart key to be accurately detected according to the comparison results, which, when the smart key is present near one door antenna (FRDR or FRAS antenna), prevents unlocking of the tail gate.

Note that this embodiment can be applied even in the following case. That is, a silent direction signal from each in-vehicle antenna leaks from FRDR antenna 114 or FRAS antenna 115, and smart key 130 positioned near FRAS antenna 115 shifts to a silent state. Further, a call signal from TG antenna 116 leaks from FRDR antenna 114 or FRAS antenna 115, and the silent state of smart key 130 is released.

All of the above completes the description of the embodiments.

In the above embodiments, the name smart key is used; a smart key is called otherwise, such as a fob key, electronic key, mobile key, and badge.

In the above embodiments, the description is made assuming that smart key microprocessor 133 performs RSSI measurement, threshold comparison, for example. However, the following operation may be performed. That is, smart key microprocessor 133 measures an RSSI and transmits the RSSI to in-vehicle unit microprocessor 128, which performs threshold comparison.

INDUSTRIAL APPLICABILITY

A short-distance radio communication system for a vehicle according to the present disclosure is useful for detecting the position of a smart key.

REFERENCE MARKS IN THE DRAWINGS 100 smart entry system (short-distance radio communication system for a vehicle)
110 in-vehicle unit (first communication device)
111 F antenna
112 M antenna
113 R antenna
114 FRDR antenna
115 FRAS antenna
116 TG antenna
117 RF receiving antenna
121 through 126 transmitting unit
127 RF receiving unit
128 in-vehicle unit microprocessor
130 smart key (portable unit, second communication device)
131 receiving antenna
132 receiving unit
133 microprocessor on the smart key
134 RF transmitting unit
135 RF transmitting antenna

The invention claimed is:

1. A short-distance radio communication system for a vehicle, comprising:
an in-vehicle unit having a plurality of antennas; and
a portable unit performing radio communications with the in-vehicle unit,
wherein the in-vehicle unit has a first antenna as an in-vehicle antenna, a second antenna as an out-vehicle antenna, and a third antenna as an out-vehicle antenna different from the second antenna, the in-vehicle unit transmitting a first burst together with a call signal for calling the portable unit through the first antenna, the in-vehicle unit transmitting a second burst subsequent to the first burst through the second antenna,
wherein the portable unit receives signals transmitted from the in-vehicle unit, measures respective received signal strength indicators from the first burst and the second burst contained in the received signals, and responds to the call signal to the in-vehicle unit according to results of comparing the respective strength indicators with predetermined thresholds, and
wherein the portable unit does not respond to the call signal to the in-vehicle unit when a first received signal strength indicator measured from the first burst does not exceed a predetermined first threshold,
wherein the portable unit does not respond to the call signal to the in-vehicle unit when the first received signal strength indicator exceeds the predetermined first threshold and a second received signal strength indicator measured from the second burst exceeds a predetermined second threshold, and
wherein the portable unit does not respond to the call signal to the in-vehicle unit when the first received signal strength indicator measured from the first burst exceeds the predetermined first threshold, the second received signal strength indicator measured from the second burst does not exceed the predetermined second threshold, and a third received signal strength indicator measured from a third burst exceeds the predetermined second threshold.

2. The short-distance radio communication system for a vehicle of claim 1, wherein one of the second antenna and the third antenna is an out-vehicle driver's side door handle antenna, and the other is an out-vehicle passenger's side door handle antenna.

3. The short-distance radio communication system for a vehicle of claim 1, wherein the portable unit does not respond to the call signal to the in-vehicle unit by shifting the portable unit to a sleep state.

4. The short-distance radio communication system for a vehicle of claim 1, wherein the portable unit responds to the call signal to the in-vehicle unit at least when the first received signal strength indicator exceeds the predetermined first threshold and both of the second received signal strength indicator and the third received signal strength indicator do not exceed the predetermined second threshold.

* * * * *